United States Patent [19]

Kraus

[11] 4,454,788

[45] Jun. 19, 1984

[54] TRACTION ROLLER TRANSMISSION WITH PREDETERMINED TRANSMISSION RATIO

[75] Inventor: Charles E. Kraus, Austin, Tex.

[73] Assignee: Excelermatic Inc., Austin, Tex.

[21] Appl. No.: 329,336

[22] Filed: Dec. 10, 1981

[51] Int. Cl.³ .................... F16H 13/06; F16H 13/00; F16D 19/00

[52] U.S. Cl. ........................... 74/798; 74/208; 74/209; 192/93 C

[58] Field of Search ............... 74/208, 206, 209, 798, 74/796; 192/93 C, 65, 79, 80, 81 R; 267/161, 162

[56] References Cited

U.S. PATENT DOCUMENTS

| 771,541 | 10/1904 | Ericson | 74/208 |
|---|---|---|---|
| 1,212,462 | 1/1917 | Donnelly | 74/206 |
| 1,704,205 | 3/1929 | Oakes et al. | 74/208 |
| 1,956,934 | 5/1934 | Stelzer | 74/206 |
| 2,636,363 | 4/1953 | Nutt | 267/161 X |
| 3,060,767 | 10/1962 | Parrett | 74/798 |
| 3,245,286 | 4/1966 | Hewko | 74/206 |
| 3,283,614 | 11/1966 | Hewko | 74/208 |
| 3,610,060 | 10/1971 | Hewko | 74/208 |
| 3,674,251 | 7/1972 | Tirabassi | 267/162 |
| 4,215,595 | 8/1980 | Kraus | 74/208 X |
| 4,422,351 | 12/1983 | Kraus | 74/209 X |

FOREIGN PATENT DOCUMENTS

| 3793 | 9/1979 | European Pat. Off. | 74/798 |
|---|---|---|---|
| 2422713 | 1/1975 | Fed. Rep. of Germany | 74/796 |
| 2600946 | 7/1977 | Fed. Rep. of Germany | 267/162 |
| 564578 | 1/1924 | France | 267/162 |
| 359570 | 2/1962 | Switzerland | 267/161 |

OTHER PUBLICATIONS

Rothbart, Harold A. *Mechanical Design and Systems Handbook*, McGraw-Hill, N.Y., 1964, pp. 14-8 and 14-9.

*Primary Examiner*—Allan D. Herrmann
*Assistant Examiner*—Stephen B. Andrews
*Attorney, Agent, or Firm*—Klaus J. Bach

[57] ABSTRACT

In a traction roller transmission which has a sun roller centrally disposed within a traction ring with motion transmitting traction rollers arranged in an annular space between the sun roller and traction ring, one of the traction ring and sun roller structures includes wave spring rings so disposed between compressing means as to cause engagement of the spring rings with the traction rollers and engagement with the sun roller and traction ring structures for transmission of motion between the sun roller and traction ring structures.

3 Claims, 5 Drawing Figures

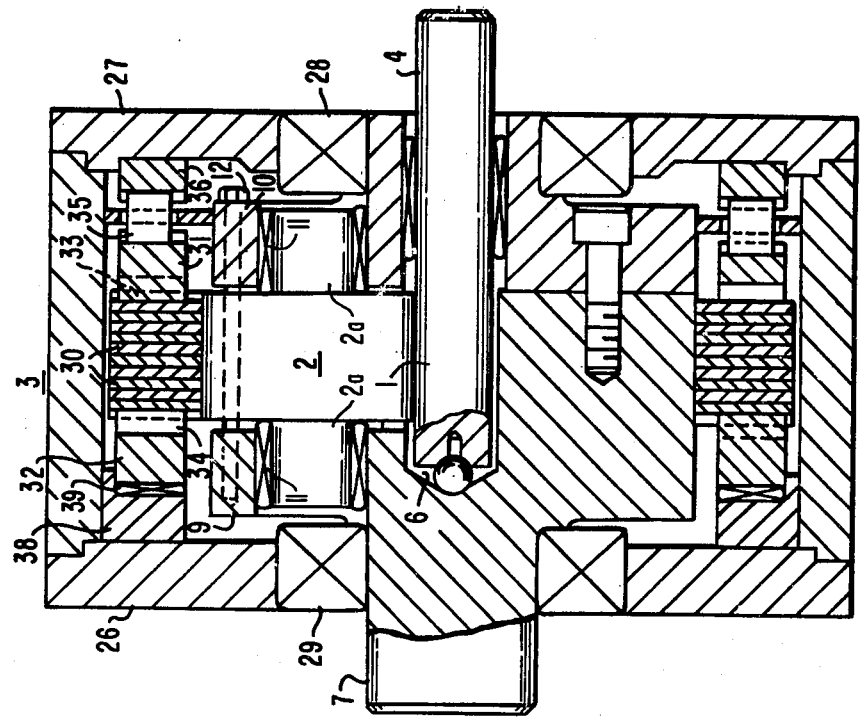
FIG. 3
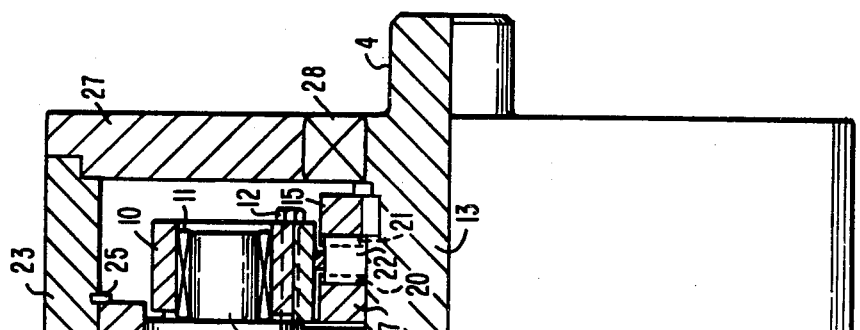

TRACTION ROLLER TRANSMISSION WITH PREDETERMINED TRANSMISSION RATIO

BACKGROUND OF THE INVENTION

1. Field of the Invention

The invention relates to fixed ratio traction roller transmissions in which the contact forces applied to the traction surfaces which are in engagement with each other for the transmission of movement are dependent on the torque transmitted through the transmission.

2. Description of the Prior Art

Traction roller transmissions in which large contact forces are applied to prevent slippage of the rollers are described for example by Harold A. Rothbart in "Mechanical Design and Systems" Handbook, pages 14-8 and 14-9, McGraw-Hill, New York, 1964. In the relatively simple arrangements of FIGS. 14.6 and 14.7 wherein the outer rings are slightly undersized to compress the roller arrangements, the surface pressure on the traction surfaces is always the same; that is, it is always high independently of the torque transmitted through the transmission. Various transmission arrangements are also known in which the contact pressure of the traction surfaces is dependent on the size of the torque transmitted through the transmission, for example, as in those shown on page 14-8 of said handbook. Other transmissions of this type are shown in U.S. Pat. Nos. 771,541; 1,212,462; 1,704,205; 1,956,934; and 3,610,060. A transmission which includes Belleville-type springs on the sun roller or the traction ring surrounding the planetary rollers is disclosed in the present inventor's earlier U.S. Pat. No. 4,215,595.

SUMMARY OF THE INVENTION

In a traction roller transmission having coaxial input and output shafts, a sun roller structure is supported by one of the shafts and traction rollers are disposed around the sun roller, while a traction ring structure surrounds, and is in contact with, the traction rollers. At least one of the traction ring and sun roller structures includes a pluarlity of wave spring rings arranged between means for compressing the wave spring rings so as to cause their engagement with the traction rollers and engagement of the traction rollers with the sun roller and the traction ring structures.

BRIEF DESCRIPTION OF THE DRAWINGS

FIG. 1 is a cross-sectional view of a traction roller transmission with waved spring rings disposed on the sun roller;

FIG. 3 is a cross-sectional view of a traction roller with spring rings forming the circular rate.

DESCRIPTION OF THE PREFERRED EMBODIMENT

Figure 2:
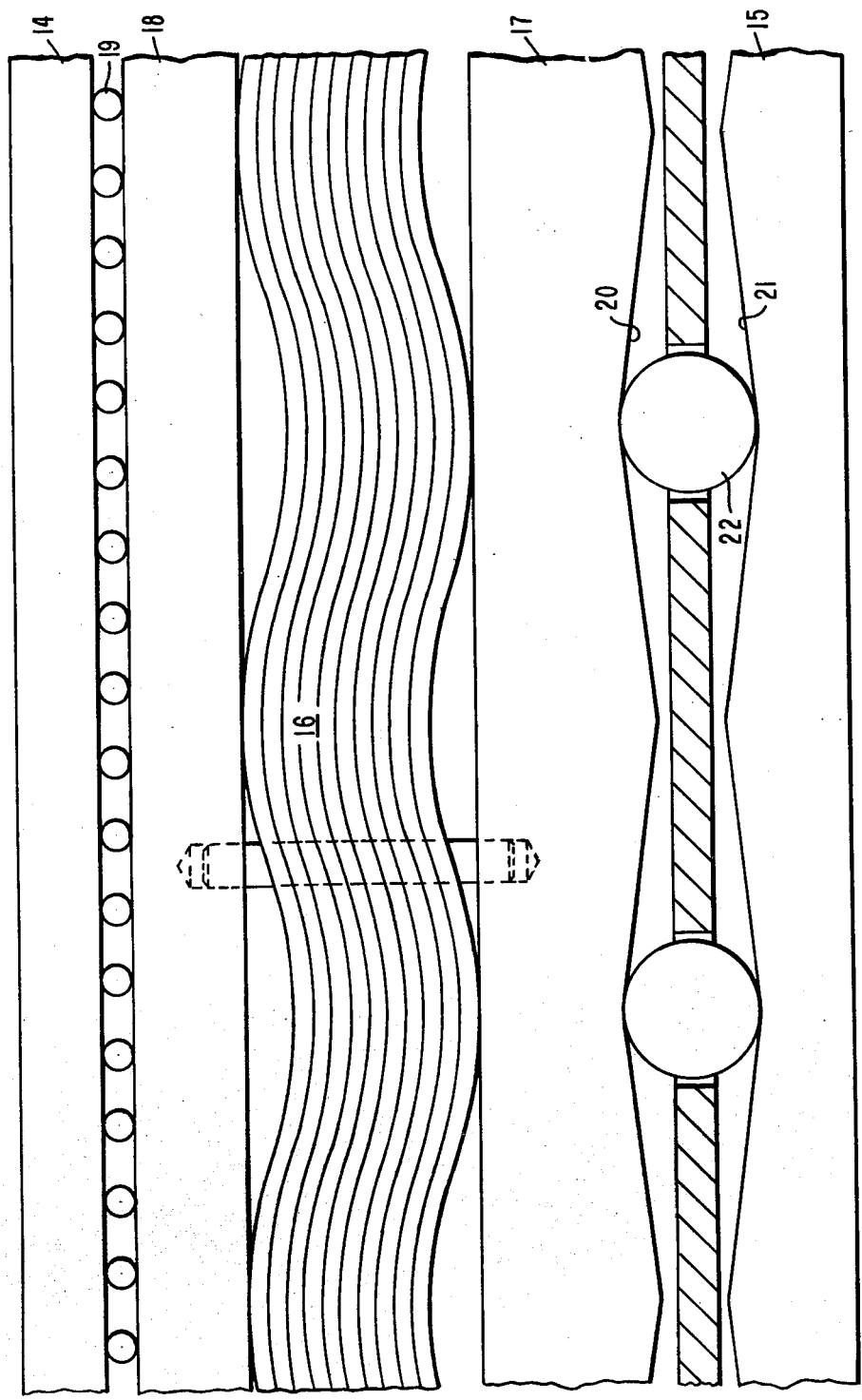
FIG. 2 is a partial elevational view of waved spring rings as they are disposed on the sun roller.

FIG. 1 shows a traction roller transmission including basically a sun roller assembly 1 centrally disposed within a traction ring assembly 3 and traction rollers 2 arranged in the annular path between the sun roller 1 and the traction ring assembly 3.

The sun roller 1 is part of, or mounted on, an input shaft 4 for rotation therewith. The input shaft 4 has a trunnion 5 extending into a bore 6 in an output shaft 7 and is supported therein by a bearing 8. The output shaft 7 has a flange 9 which, together with an opposite support structure 10, carries the traction rollers 2 with shafts 2a on roller bearings 11. The support structure 10 may be connected to the flange 9 by studs 12 for greater stability.

The traction rollers 2 are cylindrically and are in frictional engagement with the central sun roller 1. The sun roller 1 consists of a support cylinder 13 having opposite flanges 14 and 15 with undulated spring rings 16 carried on the support cylinder 13 between a cam ring 17 and a stop ring 18 and axially supported by a thrust bearing 19. Flange 15 is keyed to the shaft 4 for rotation therewith. The cam ring 17 and preferably also the flange 15 have cam surfaces 20 and 21 with rollers 22 disposed therebetween such that a torque transmitted through the transmission will axially compress the spring rings 16 so that they straighten and expand radially against the traction rollers 2 for firm engagement of the traction rollers with the spring rings 16 and the traction ring assembly 3.

The traction ring assembly 3 consists of a housing ring 23 having a race ring 24 mounted thereon by means of two retaining rings 25. The housing ring 23 is mounted on housing side walls 26 and 27 which support the input and output shafts 4 and 7 by bearings 28 and 29 respectively.

For detailed design features of the basic transmission reference is made at this point to this applicant's U.S. Pat. No. 4,215,595.

The wave spring rings 16 are shown in detail in FIG. 2, which is an elevational view of a section of the sun roller structure 1 enlarged for better understanding. FIG. 2 shows the wave shape of the spring rings 16 which, when compressed between the cam ring 17 and the stop ring 18, are flattened to thereby expand radially.

FIG. 3 shows an embodiment wherein the wave spring rings 30 are disposed around the traction rollers 2. In such an arrangement the wave springs have to contract radially for firmer engagement with the traction rollers and therefore have to be forced into larger wave shape by a torque transmitted through the transmission.

In FIG. 3 parts corresponding to similar parts of the embodiment shown in the FIG. 1 are referenced with the same numerals. The arrangement however which provides for axial contraction of the wave spring rings 30 is shown in detail in FIGS. 4 and 5.

Figure 4:
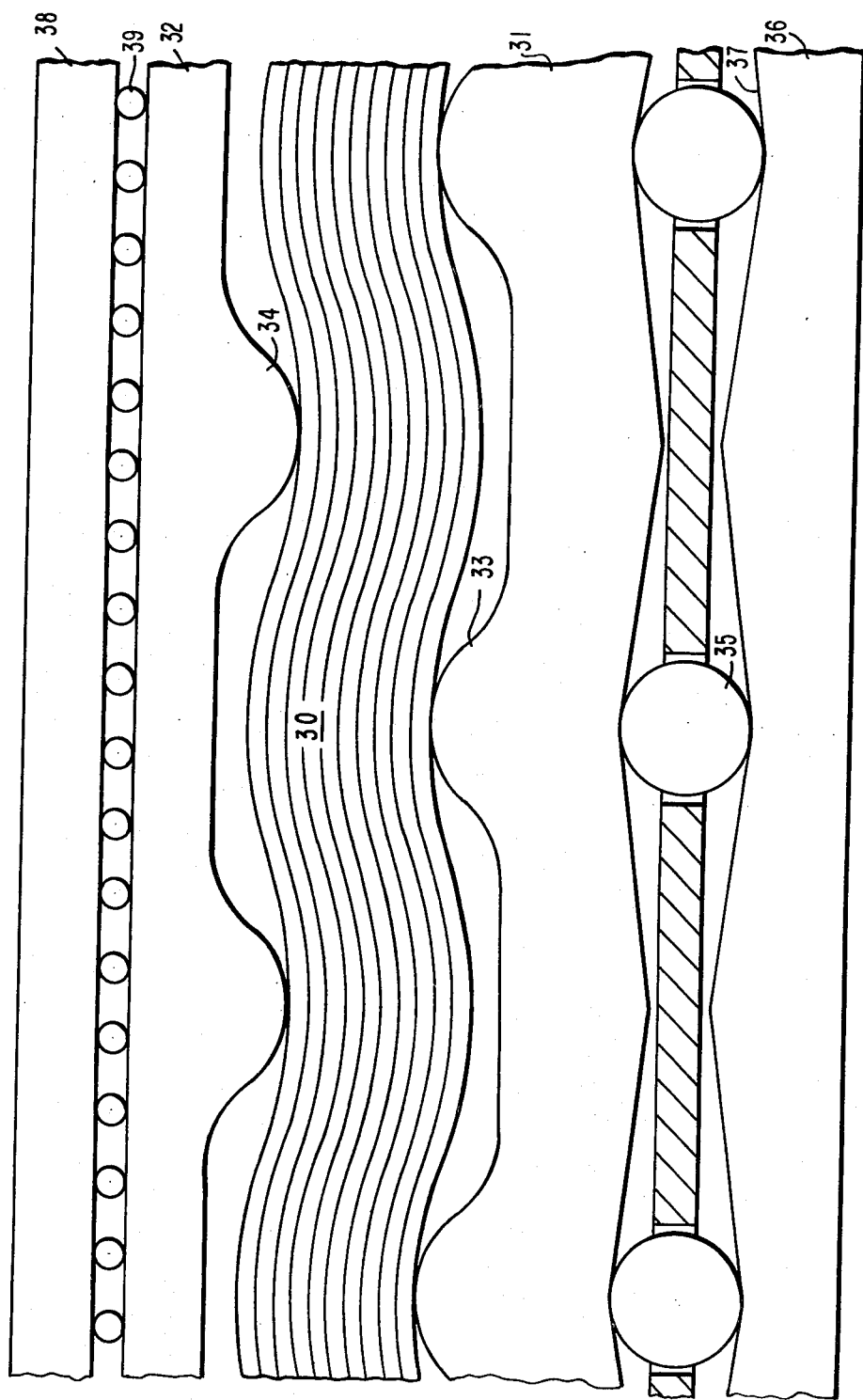
FIGS. 4 and 5 show, in elevation, embodiments of the spring rings used in connection with the arrangement of FIG. 3.
Figure 5:
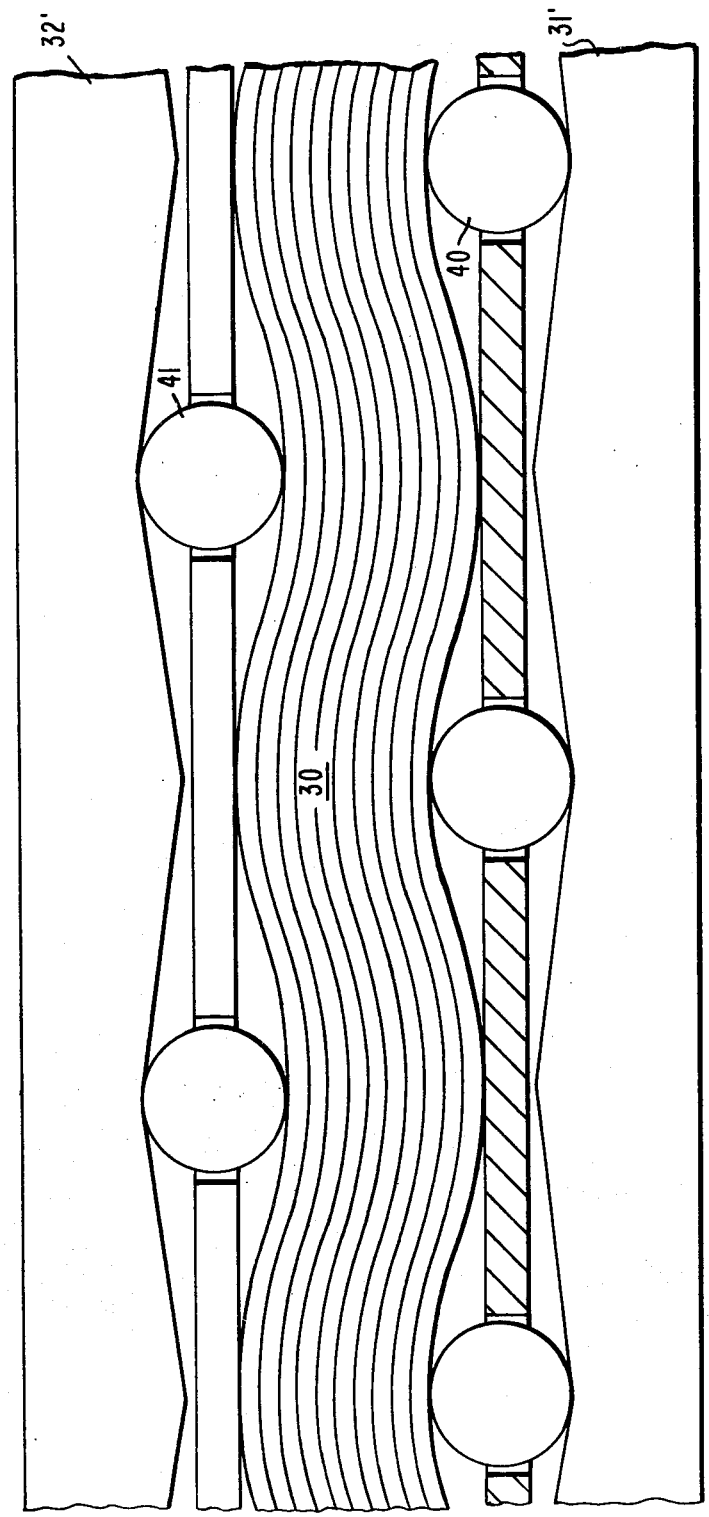

As shown in FIGS. 3 and 4, a cam ring 31 and the stop ring 32 have spaced projections 33 and 34 alternately arranged at opposite sides of the wave spring rings 30 such that the wave spring rings 30 are forced into greater wave shape when the cam ring 31 and stop ring 32 are forced toward each other by a torque transmitted through the transmission whereby the diameter of the wave spring rings 30 is reduced and the traction rollers 2 are compressed and forced into firm frictional engagement with the spring rings 30 and the sun roller 1. Cam roller 35 may directly abut the housing 27 but, preferably, a reaction ring 36 is disposed adjacent the housing wall 27 and also provided with cams 37. On the opposite side there is provided a support race 38 with an axial thrust bearing 39. In the arrangement as shown in FIG. 5, both pressure rings 31' and 32' have cam surfaces adjacent the wave springs rings 30, and rollers 40, 41 are disposed between the cam rings 31', 32' and the wave spring rings 30 for directly applying the bending forces thereto when a torque is transmitted through the transmission.

With the arrangement according to the present invention, relatively large diameter changes of the wave spring rings can be achieved. Furthermore the spring ring edges are always normal to the traction surfaces and engage the traction surfaces over their full width thereby providing for a relatively small surface pressure. It is also noted that grinding of the wave spring is relatively simple and that only the radially outer or inner surface needs to be ground accurately. As a result, transmissions with wave springs as disclosed herein can be built relatively inexpensively and they can be relatively light-weight.

Operation

As described in greater detail in U.S. Pat. No. 4,215,595, rotation of the input shaft 4 and the sun roller structure 1 drives the traction rollers 2 which roll along the race ring 24 and carry along the traction roller support structure 9, 10, thereby rotating output shaft 7 at reduced speed. A torque transmitted through the transmission is applied by the input shaft 4 to flange 15 and through cam surfaces and ring structures 21, 22, 20, 17 to the spring rings 16 which are axially compressed by the cam structure with a force depending on the torque transmitted. The undulated spring rings 16, when compressed between the cam ring 17 and the stop ring 18, are straightened out and, as a result, expand radially, thereby forcing the traction rollers in close contact with the race ring 24 and the outer surfaces of the spring rings 16 with contact forces which depend on the torque transmitted through the transmission.

I claim:

1. A traction roller transmission comprising: a traction ring structure having an inner traction surface; a sun roller centrally disposed within the traction ring structure and having a circumferential traction surface spaced from the traction surface of said traction ring structure, at least one of said traction surfaces being formed by the circumferential surface formed by a stack of wave spring rings; planetary traction rollers supported in the annular space between said traction surfaces; pressure rings disposed axially adjacent said wave spring rings; and axial cam means associated with at least one of said pressure rings and adapted to force said one pressure ring toward the other so as to deform said wave spring rings to thereby change the diameter thereof for forcing said traction rollers into firm frictional engagement with said inner and circumferential traction surfaces.

2. A traction roller transmission as claimed in claim 1, wherein said wave springs are associated with said sun roller and said pressure rings are adapted to compress and flatten said wave spring rings when a torque is transmitted through said transmission thereby providing for an increase in diameter of said spring rings and force their circumferential surface outwardly against said traction rollers.

3. A traction roller transmission as claimed in claim 1, wherein said wave springs are associated with said traction ring structure and said pressure rings have alternately disposed axial projections abutting said wave spring rings and further bending said wave spring rings upon transmission of a torque through the transmission thus causing a reduction in diameter of said wave spring rings to force the inner surfaces thereof into firm frictional engagement with said traction rollers.

* * * * *